(12) United States Patent
Hersey

(10) Patent No.: US 6,763,595 B1
(45) Date of Patent: Jul. 20, 2004

(54) LASER-BASED TOOL FOR INDICATING LEVEL, PLUMB AND SQUARE

(75) Inventor: William Hersey, Corte Madera, CA (US)

(73) Assignee: PLS - Pacific Laser Systems, Sausalito, CA (US)

( * ) Notice: Subject to any disclaimer, the term of this patent is extended or adjusted under 35 U.S.C. 154(b) by 0 days.

(21) Appl. No.: 10/176,881

(22) Filed: Jun. 21, 2002

(51) Int. Cl.[7] ............................................. G01C 15/00
(52) U.S. Cl. ..................... 33/286; 33/290; 33/DIG. 21; 33/291
(58) Field of Search .................. 33/286, 290, DIG. 21, 33/291, 227, 281, 283, 285, 282; 340/686.1, 691.4, 691.7, 691.8

(56) References Cited

U.S. PATENT DOCUMENTS

| | | | |
|---|---|---|---|
| 5,144,487 A | | 9/1992 | Hersey ........................ 359/629 |
| 5,243,398 A | * | 9/1993 | Nielsen ........................ 33/290 |
| 5,539,990 A | | 7/1996 | Le .............................. 33/283 |
| 5,599,050 A | * | 2/1997 | Tinsley ........................ 292/230 |
| 5,629,921 A | * | 5/1997 | Eastman et al. ........ 369/124.15 |
| 5,782,003 A | | 7/1998 | Bozzo |
| 5,864,956 A | * | 2/1999 | Dong ........................... 33/227 |
| 5,992,029 A | | 11/1999 | Dong |
| 6,035,540 A | * | 3/2000 | Wu et al. ..................... 33/286 |
| 6,470,578 B1 | * | 10/2002 | Phuly et al. .................. 33/286 |
| 2003/0051355 A1 | * | 3/2003 | Phuly et al. .................. 33/286 |
| 2003/0101605 A1 | * | 6/2003 | Tacklind et al. ............... 33/286 |
| 2003/0101606 A1 | * | 6/2003 | Li .............................. 33/286 |

OTHER PUBLICATIONS

LaserMark® Gizmo II & III Laser Cross Levels. Datasheet (2 pages) [online] CST Corp. [retrieved on May 28, 2002]. Retrieved on the Internet.
Compact Laser System with Beam Splitting Prism. Datasheet (2 pages) [online] Stabila [retrieved May 28, 2002]. Retrieved on the Internet.
Laserjamb Q2. Datasheet (3 pages) [online] Laserjamb [retrieved May 29, 2002]. Retrieved on the Internet.
Laser Genius™ 3210. Datasheet (2 pages) [online] Quarton Inc., 2000 [retrieved May 29, 2002].

* cited by examiner

*Primary Examiner*—Christopher W. Fulton
*Assistant Examiner*—Amanda J Hoolahan
(74) *Attorney, Agent, or Firm*—Fish & Richardson P.C.

(57) ABSTRACT

The present invention provides apparatus and a method for projecting an indication of alignment. The invention features forming a first output beam, and a second output beam that is substantially perpendicular to the first output beam. The first output beam indicates level, the second output beam indicates plumb, and the first and second output beams together indicate square. An error indicator indicates an error in the accuracy of the first and second output beams as indicators of level and plumb respectively. The error indicator can be deactivated, such that the first and second output beams together can be used at least to indicate square.

46 Claims, 13 Drawing Sheets

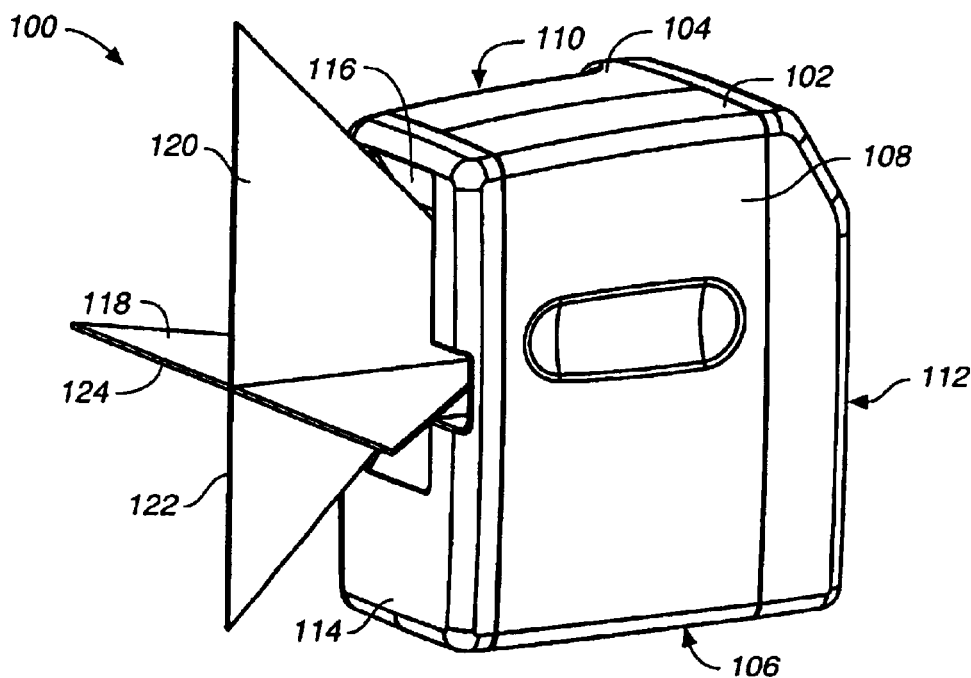
FIG._1
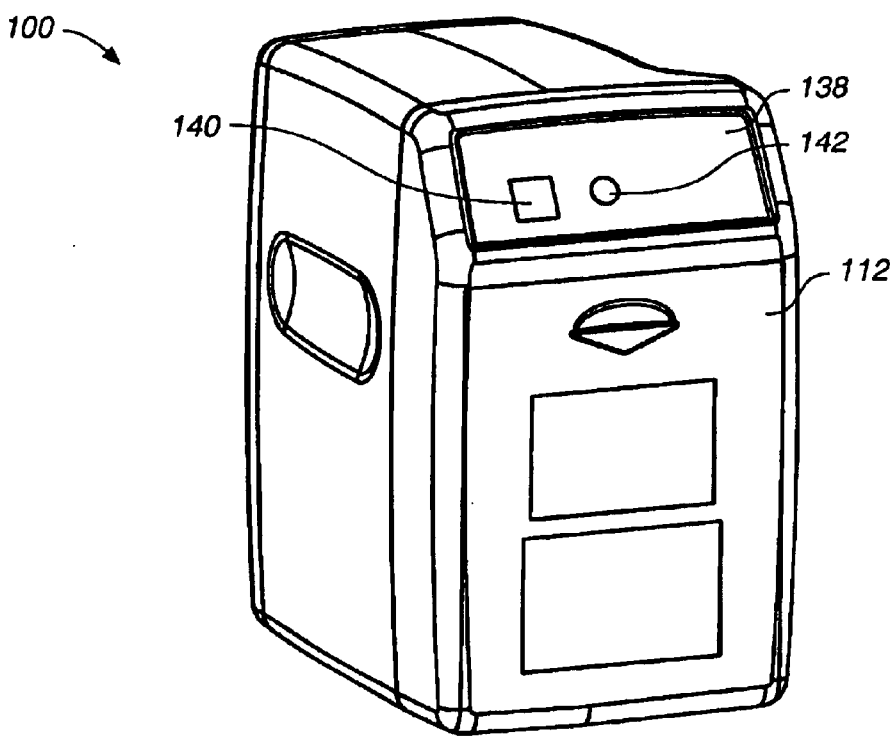
FIG._4

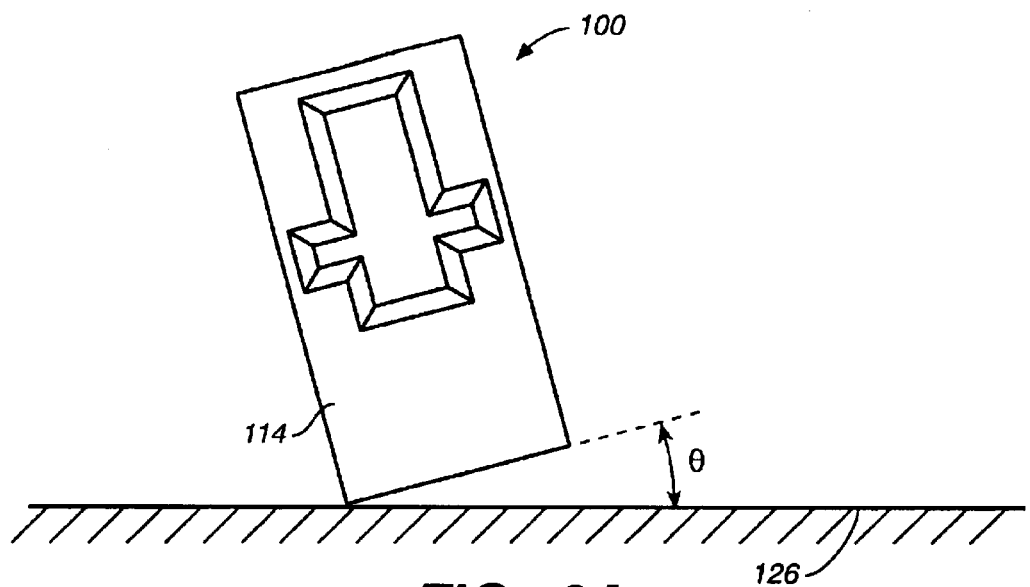
FIG._2A
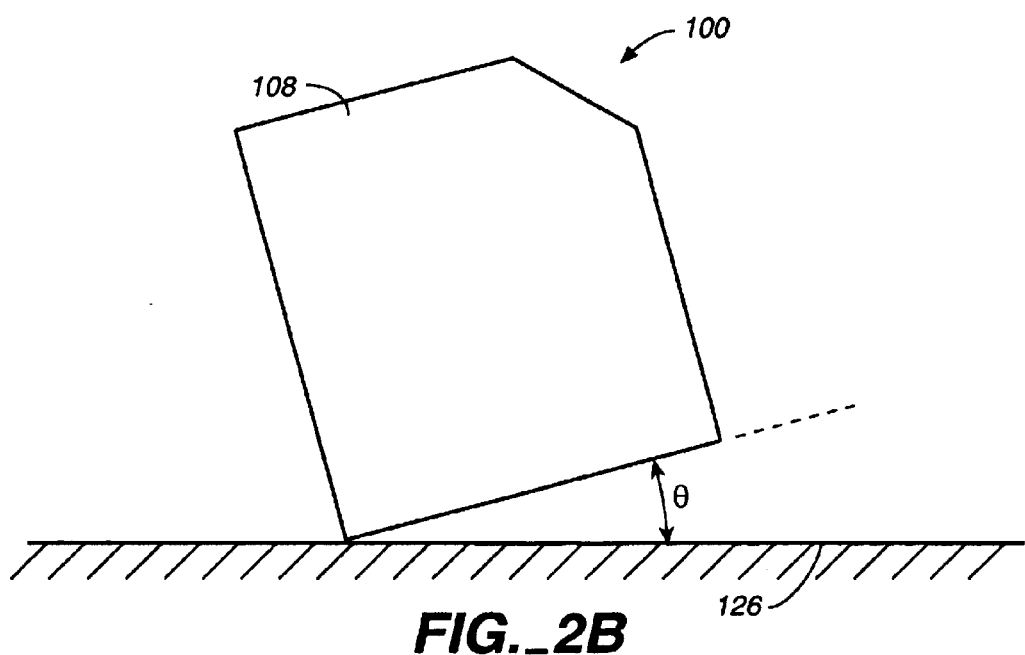
FIG._2B

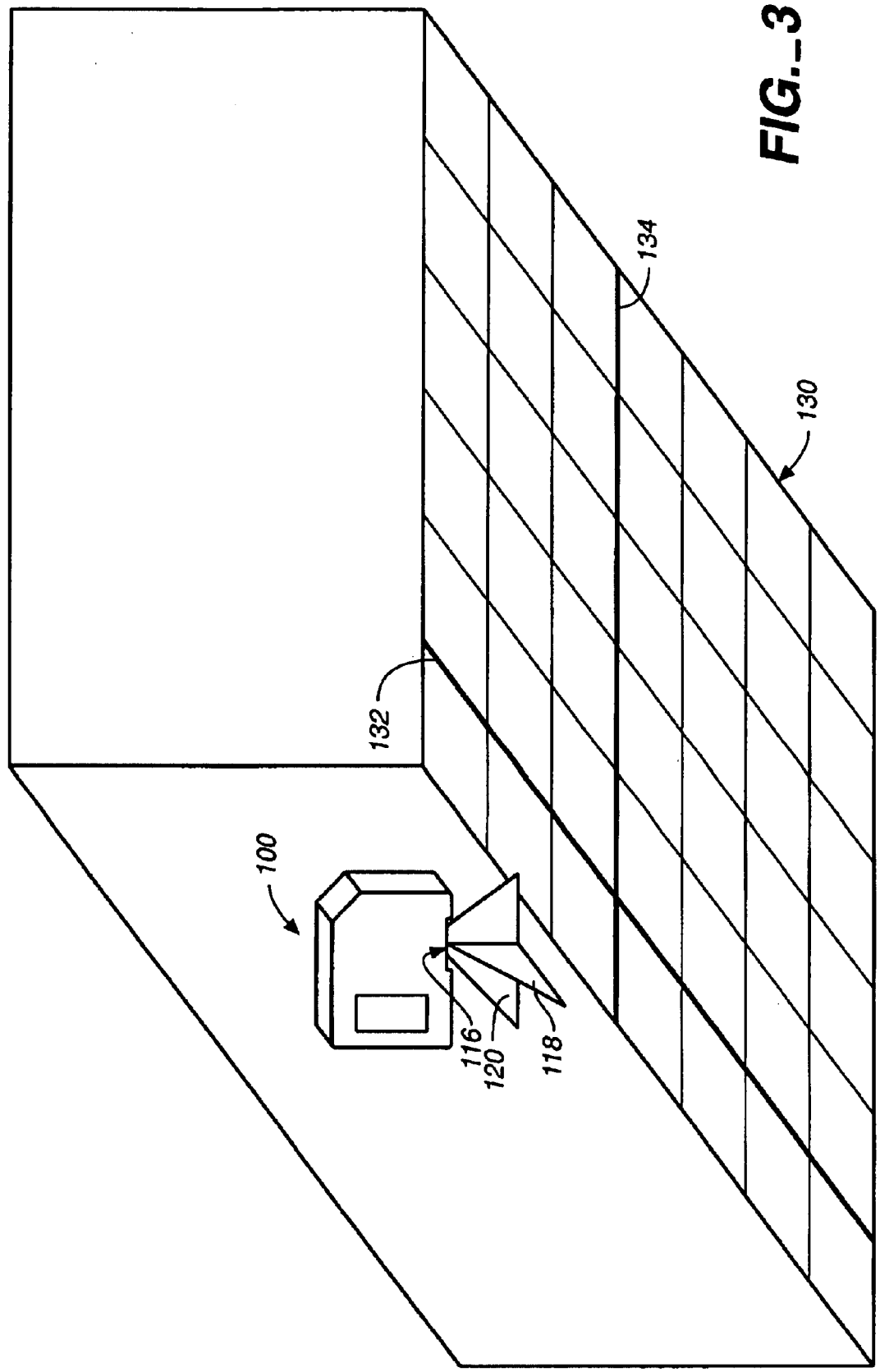
FIG._3

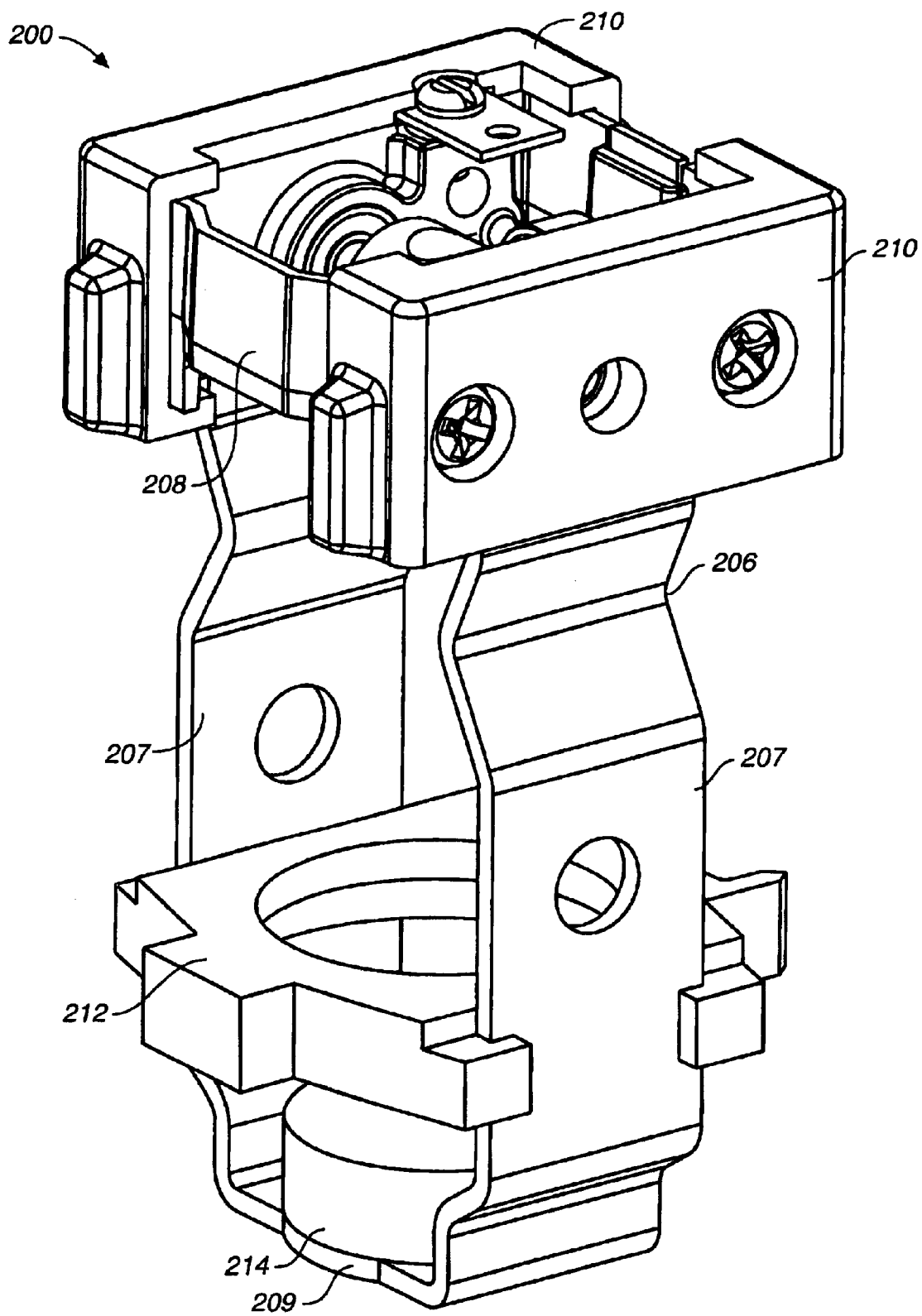
FIG._5

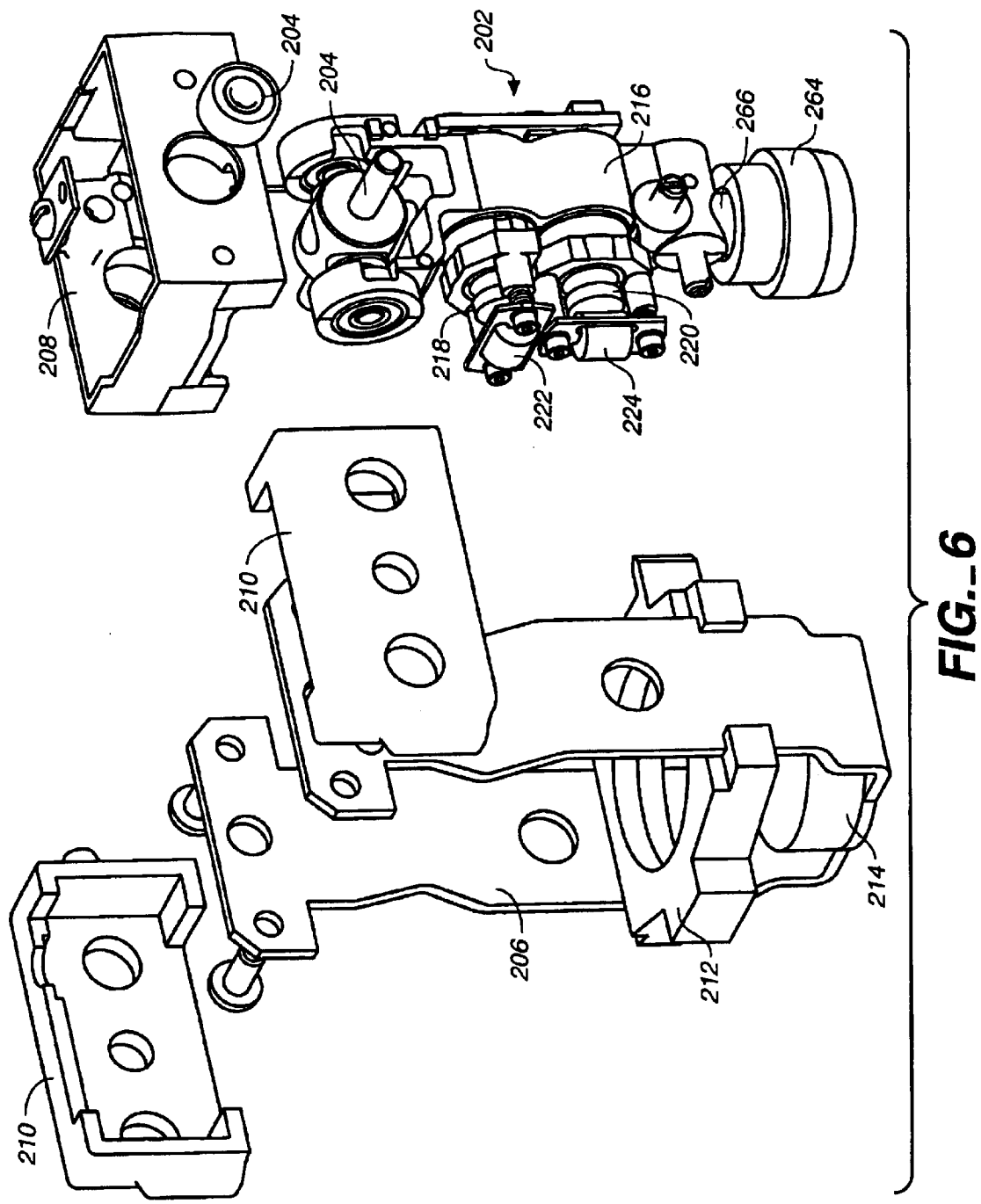
FIG._6

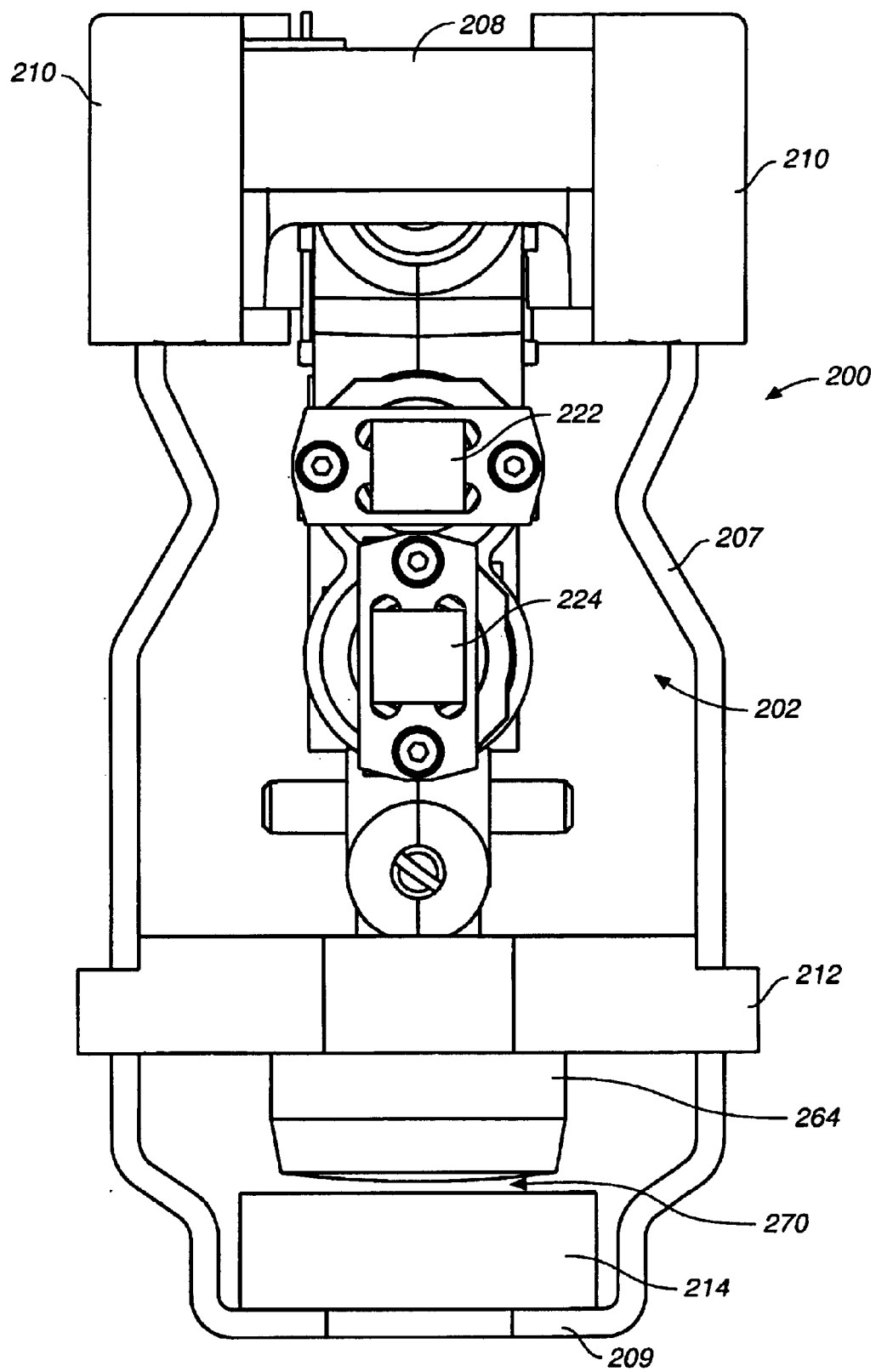
FIG._7

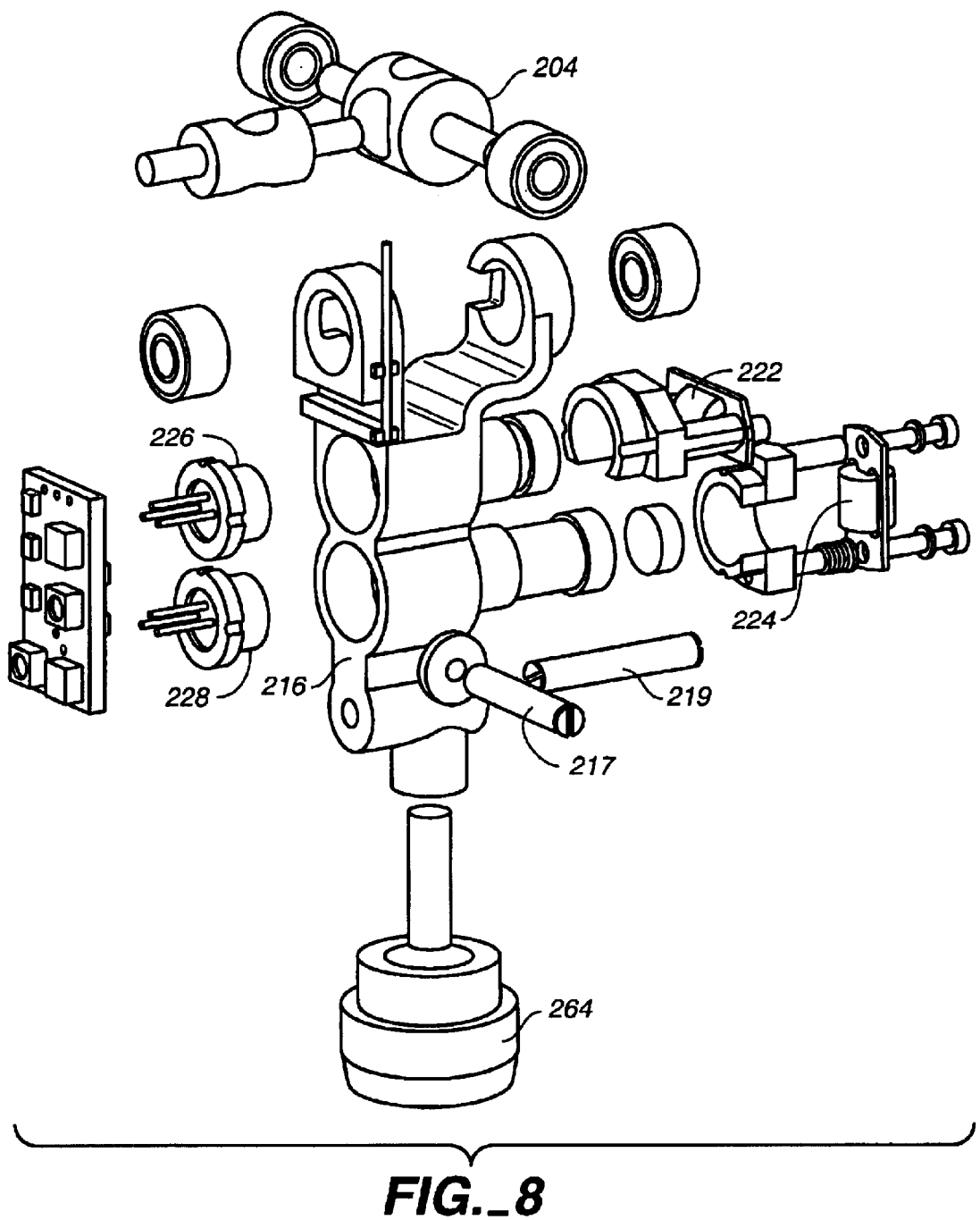
FIG._8

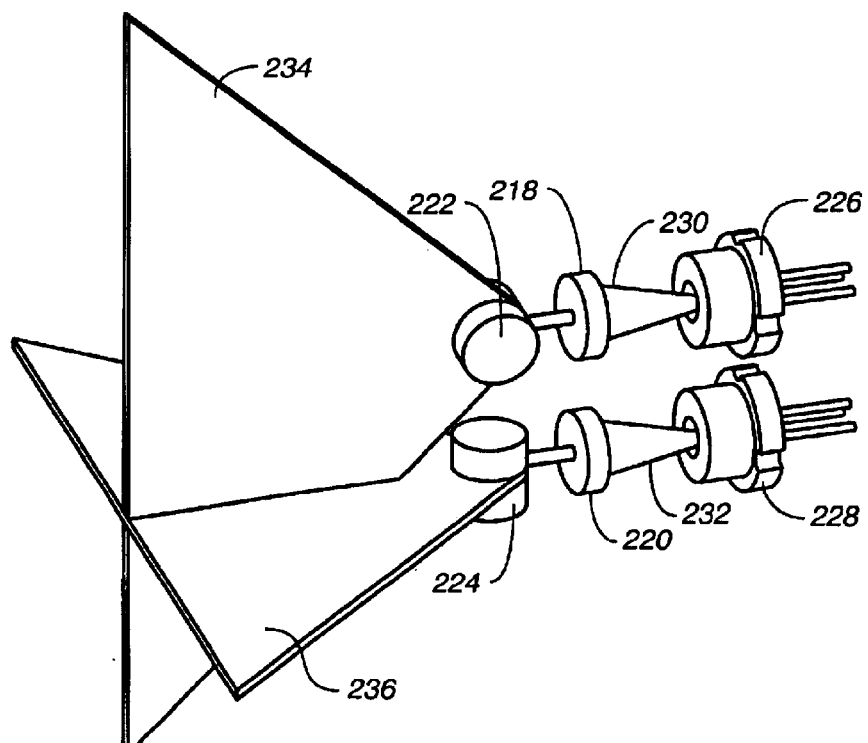
FIG._9A
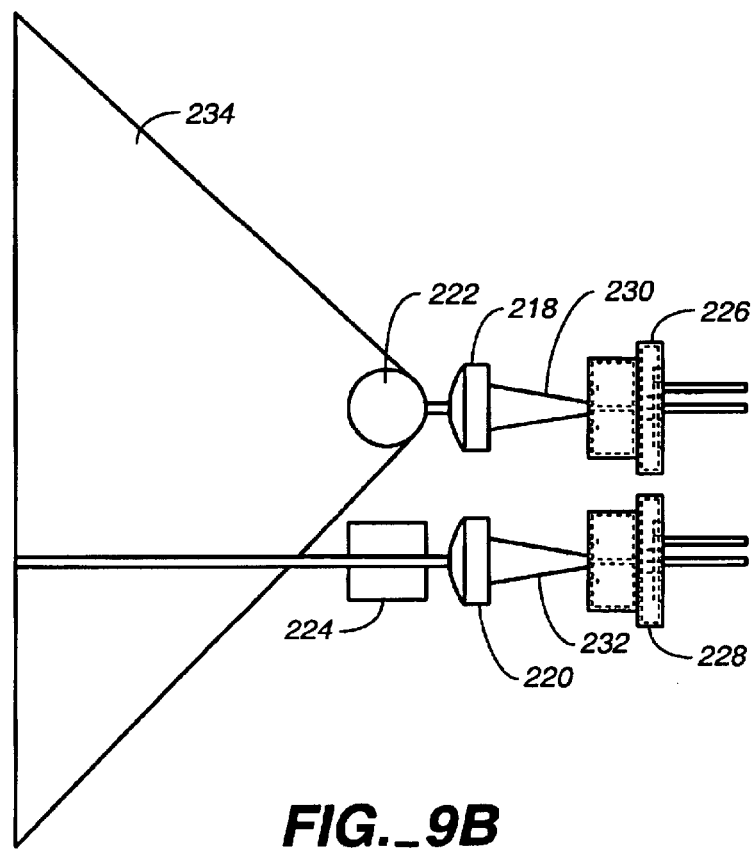
FIG._9B

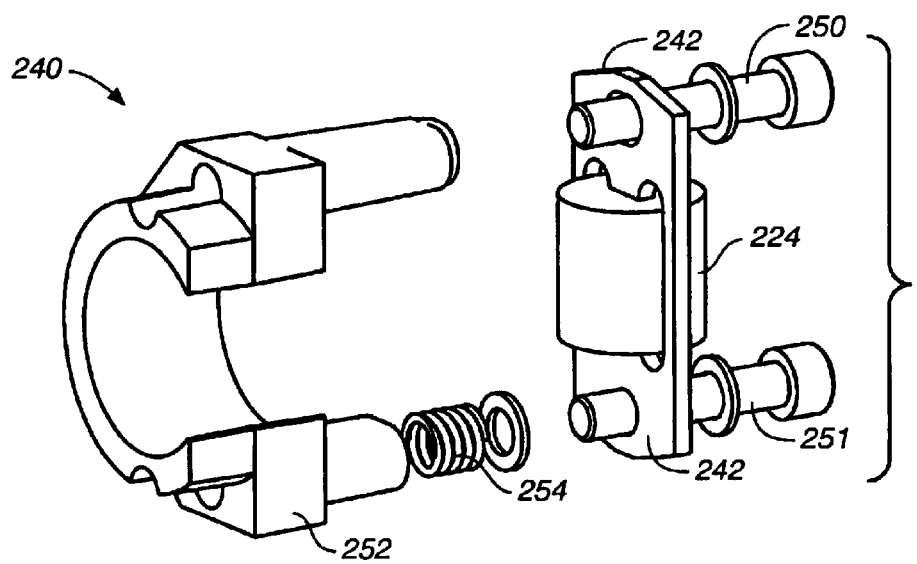
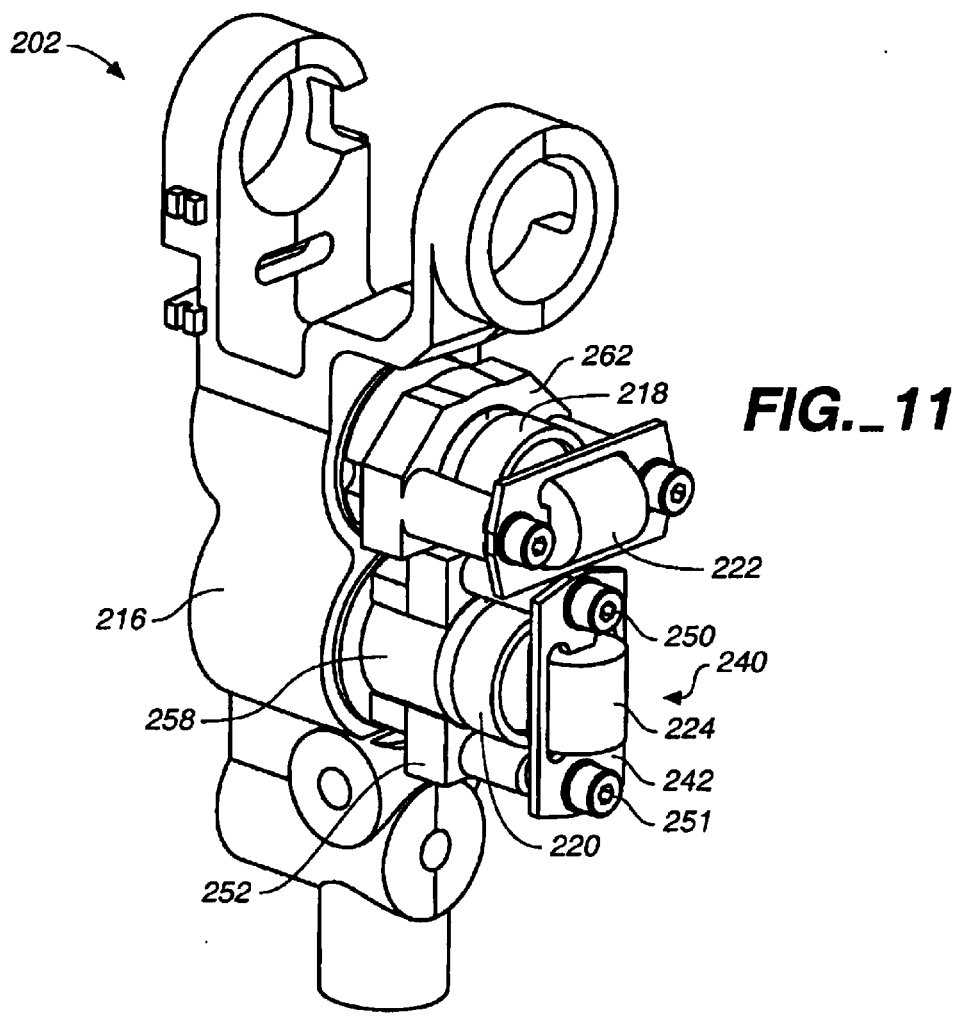
FIG._10
FIG._11

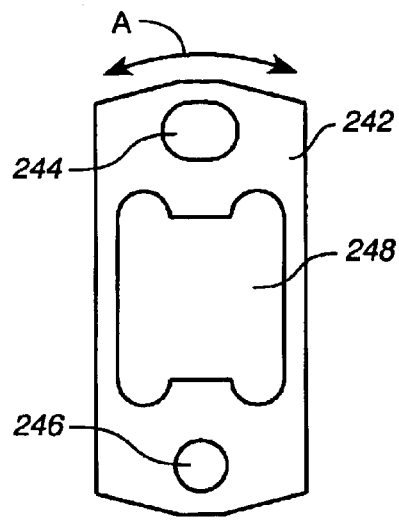
FIG._12A
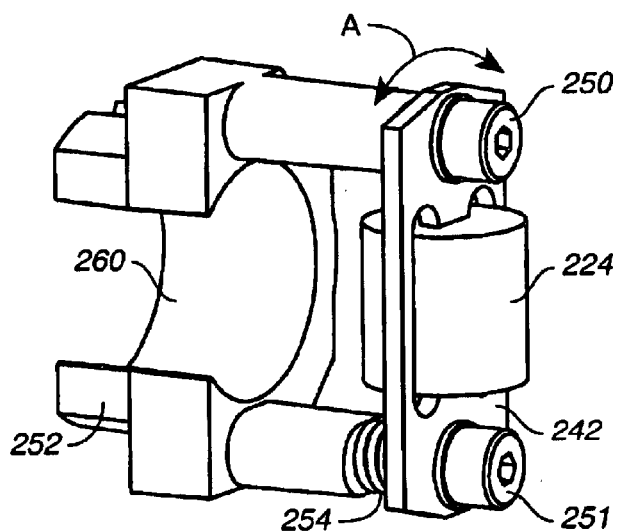
FIG._12B
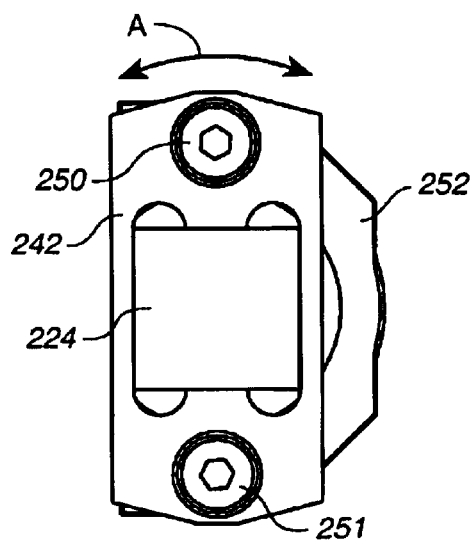
FIG._12C

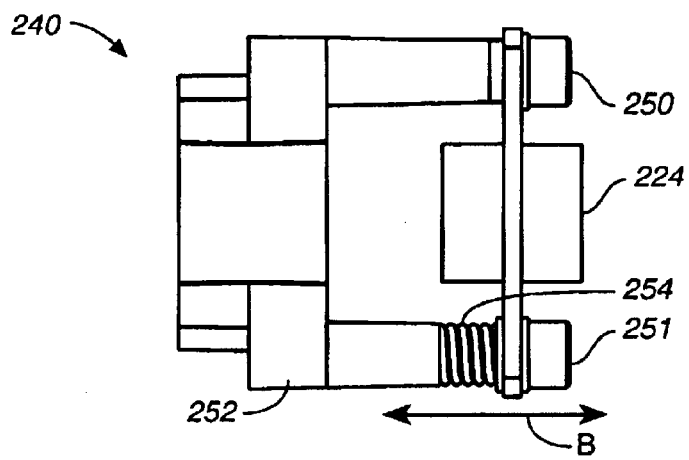
FIG._13
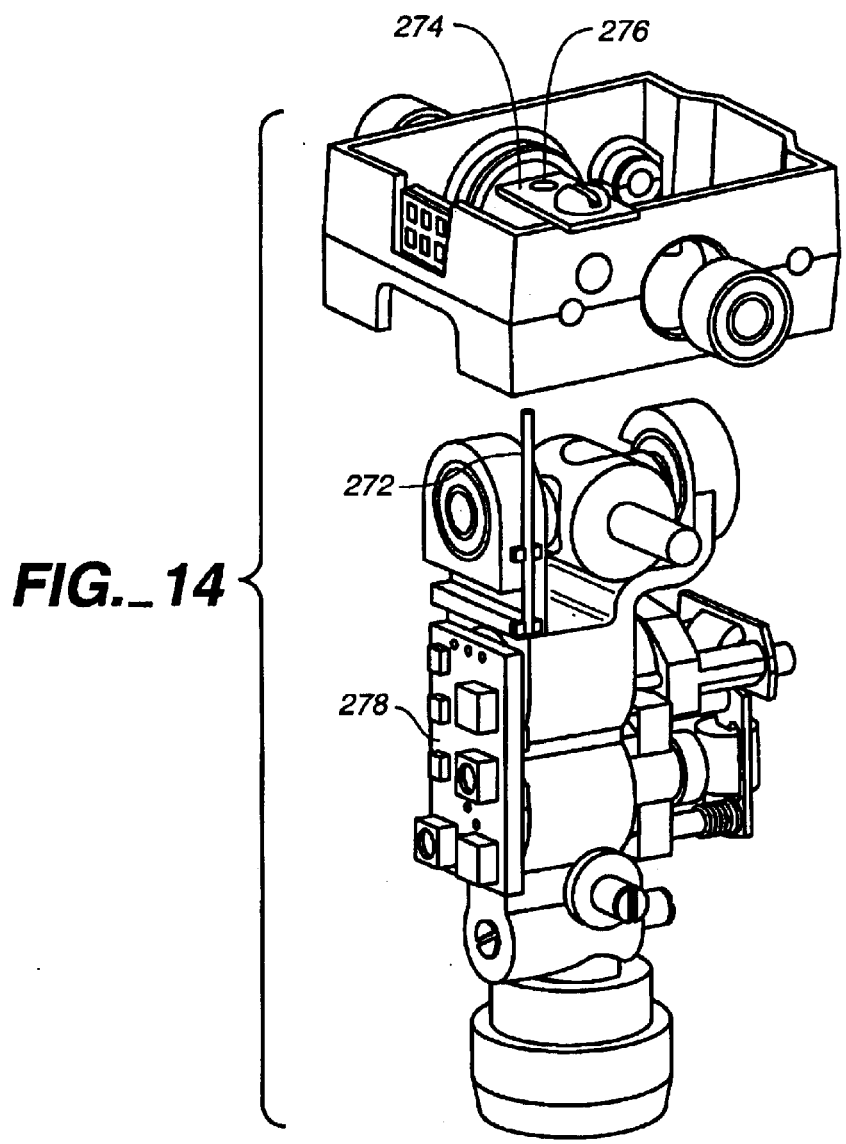
FIG._14

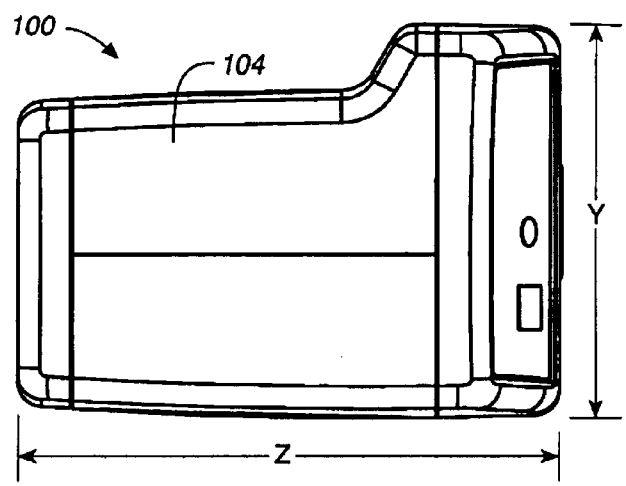
FIG._15A
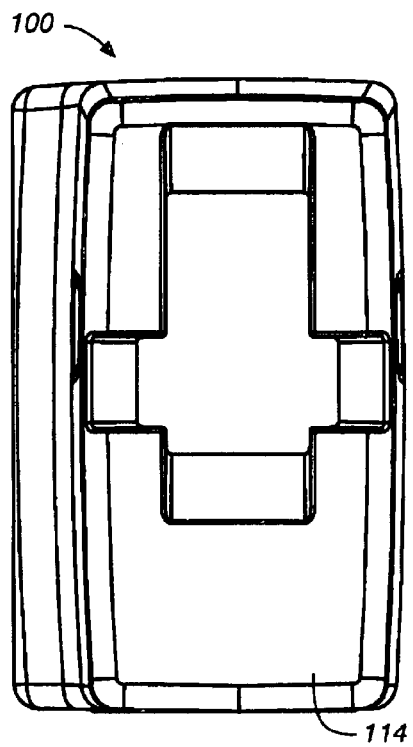
FIG._15B
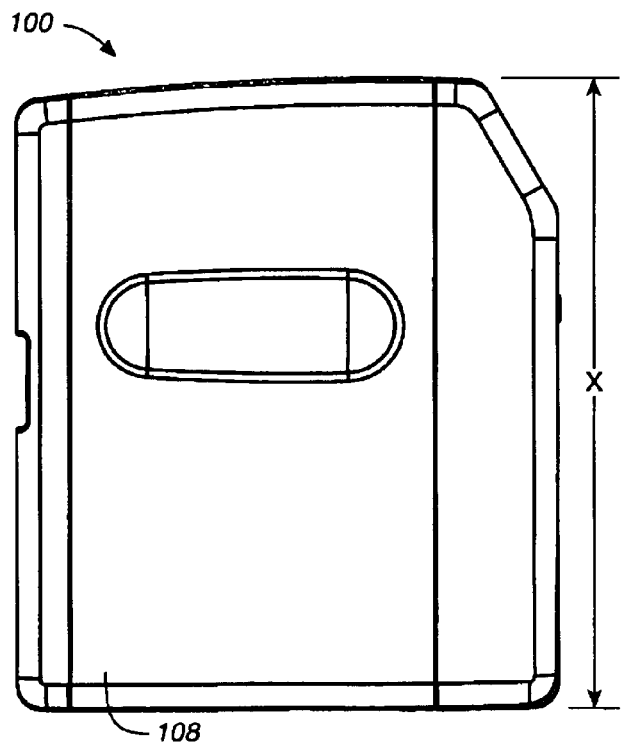
FIG._15C

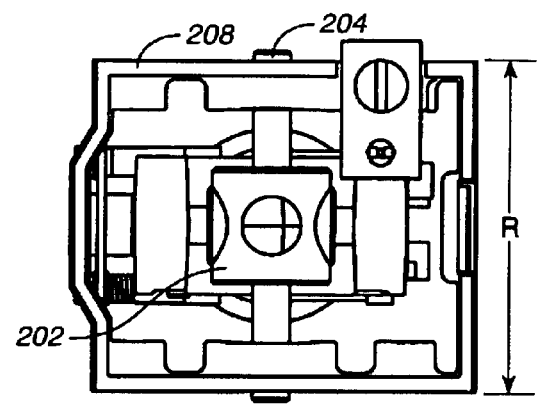
FIG._16A
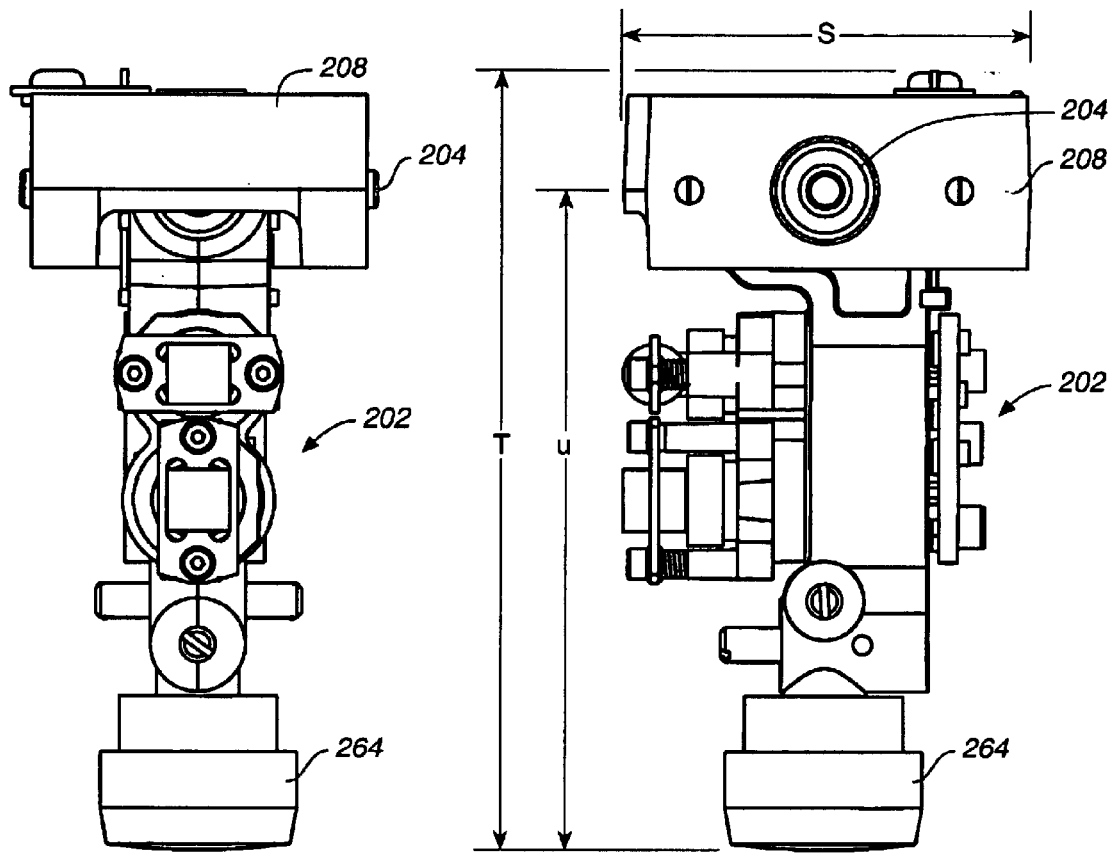
FIG._16B          FIG._16C

LASER-BASED TOOL FOR INDICATING LEVEL, PLUMB AND SQUARE

TECHNICAL FIELD

This invention relates to laser alignment devices.

BACKGROUND

Portable devices capable of indicating level, plumb and square alignment have been useful in the construction and carpentry trades for some time. The advent of laser technology has seen the use of portable laser emitting devices capable indicating level and plumb, as well as level, plumb and square alignments simultaneously. Such devices typically require some sort of tilt-compensation mechanism or self-leveling mechanism, to avoid the introduction of error when operated from a non-level surface. However, even with a tilt-compensation or self-leveling mechanism, such tools typically can only accurately indicate level and plumb within a range of inclinations of the tool relative to level. To avoid a user inadvertently relying on an erroneous indication of alignment, some tools provide an indication to the user, when the user is attempting to use the tool outside of a predefined range of inclinations, for example, by ceasing projection of alignment beams or causing the alignment beams to blink. Although level and plumb alignments may be inaccurate when the tool is inclined beyond a certain range, it may still be possible to achieve an accurate square alignment using the laser beams.

In some prior art tools, alignment is indicated with beams that form points of light or "spots" on a surface against which they are projected. In some prior art tools, an invisible "line" can be imagined between two or more opposing and aligned spots to provide an alignment line. Other tools indicated alignment with beams that form the image of a straight line on the surface against which they are projected, that is, they project linear alignment beams.

SUMMARY

The present invention provides apparatus and a method for projecting alignment lines. In general, in one aspect, the invention features an apparatus for projecting an indication of alignment, including a housing, a projection unit pendulously suspended in the housing to project output beams to indicate level, plumb and square and a damper to dampen pendular motion of the projection means. The apparatus further includes an error indicator to indicate when the housing is inclined such that the accuracy of the level and plumb directions are compromised, and an override to deactivate the error indicator, whereby the output beams can be used at least to indicate square.

Implementations of the invention may include one or more of the following. The projection unit can include at least one laser diode to emit a laser beam, a first and a second collimator to form a first and a second collimated beam, and a first and a second optical element to convert the first and second collimated beam into a first and a second linear output beam. The first and second linear output beams are projected from the housing in different but generally perpendicularly related directions, and can be used to indicate level, plumb and square alignment.

The error indicator can suspend projection of the output beams from the projection unit. The error indicator can indicate that the housing is inclined such that the accuracy of the level and plumb directions are compromised, when the housing is inclined in any direction in the range of approximately plus or minus 4 to 9 degrees from horizontal. In another implementation, the error indicator can indicate the housing is inclined such that the accuracy of the level and plumb directions are compromised, when the housing is inclined in any direction more than approximately 9 degrees from horizontal. The override can include digital circuitry to deactivate the error indicator in response to a user input.

Each collimator can include a focus lens, and in one embodiment each focus lens can be an aspheric lens. Each optical element can include a rod lens, or alternatively a cylinder lens. The damper can include a magnet mounted in the housing below the projection unit and a damping plate rigidly suspended from the projection unit, such that the damping plate is positioned above the magnet with a gap maintained therebetween sufficiently small that eddy currents are generated in the damping plate by motion thereof above the magnet. The apparatus can further include at least one battery to provide power to at least one laser diode of the projection unit.

A user interface configured to receive a user input can also be included in the apparatus. In response to a first user input, the projection unit can project a first output beam that can be used to indicate level. In response to a second user input, the projection unit can project a second output beam having a generally perpendicular relationship to the first output beam, whereby the second output beam can be used indicate plumb. In response to a third user input, the projection unit can project simultaneously the first and second output beams, whereby together the output beams can be used to indicate simultaneously level, plumb and square. In response to a fourth user input, the override can be employed to deactivate the error indicator, and the projection unit can project simultaneously the first and second output beams, whereby the output beams together can be used to at least indicate square.

In general, in another aspect, the invention features an apparatus for projecting an indication of alignment including a housing and a projection unit pendulously suspended in the housing to project linear output beams. The projection unit includes two laser diodes configured and arranged to emit two laser beams, two collimators configured and arranged to form the two laser beams into a first and second collimated beam, and an optical element configured and arranged to convert the first and second collimated beams into a first and a second linear output beam. The first and second linear output beams are projected from the housing in different but generally perpendicularly related directions, and can be used to simultaneously indicate level, plumb and square. The optical element includes a first and second lens to convert the first and second collimated beams into the first and second linear output beams, and a mount to mount the first and second lens to the projection unit.

For each lens, the mount includes a member in which the lens can be mounted and a base. The member also includes openings through which connectors can be positioned. The openings allow the member to be laterally displaced once the connectors are in position, to align the lens such that the linear output beam is symmetrically projected from the housing. The base is configured to attach to the member by the connectors. At least one connector includes a longitudinal adjustment mechanism to adjust the position of the lens such that the output beam is substantially straight. The base is mounted onto a support protruding from the projection unit and rotatable about the support to achieve true vertical in relation to the projection unit for the first lens and true horizontal in relation to the projection unit for the second lens.

The apparatus further includes a damper configured and arranged to dampen pendular motion of the projection unit.

Implementations of the invention may include one or more of the following. An error indicator can be configured and arranged to indicate when the housing is inclined such that the accuracy of the level and plumb directions are compromised. An override device can be configured and arranged to deactivate the error indicator, so that the output beams can be used as alignment lines to at least indicate square directions.

The error indicator can suspend projection of the linear output beams from the projection unit. The error indicator can indicate the housing is inclined such that the accuracy of the level and plumb directions are compromised, when the housing is inclined in any direction in the range of approximately plus or minus 4 to 9 degrees from horizontal. In another embodiment, the error indicator can indicate the housing is inclined such that the accuracy of the level and plumb directions are compromised, when the housing is inclined in any direction more than approximately 9 degrees from horizontal.

The longitudinal adjustment mechanism of the mount can be a spring. Each collimator can include a focus lens and, in one embodiment, each focus lens can be an aspheric lens. The first and second lens can each be a rod lens or a cylinder lens.

In general, in another aspect, the invention features a method for projecting an indication of alignment. The method includes forming a first alignment beam and a second alignment beam that is substantially perpendicular to the first alignment beam, whereby the first alignment beam indicates level, the second alignment beam indicates plumb, and the first and second alignment beams together indicate square. An error indicator is provided to indicate an error in the accuracy of the first and second alignment beams as indicators of level and plumb respectively. The error indicator can be deactivated, such that the first and second alignment beams together can be used at least to indicate square.

Implementations of the invention may include the following. The method can further include projecting a first and second laser beam, and collimating the first and second laser beam into a first and a second collimated beam incident on a first and a second optical element to convert the first and second collimated beams into the first and second alignment beams. The alignment beams can be projected in the image of substantially straight lines.

In general, in another aspect, the invention features a method of projecting indications of alignment from a laser-based tool, the method including, in response to a first user input received from a user interface that interacts with a user of the laser-based tool, projecting a first linear output beam that can be used to indicate level, and indicating any error in the accuracy of the first linear output beam as an indicator of level when the tool is positioned outside of a predetermined accuracy range.

In response to a second user input received from the user interface, a second linear output beam being substantially perpendicular to the first linear output beam is projected, whereby the second linear output beam can be used to indicate plumb. Any error in the accuracy of the second linear output beam as an indicator of plumb when the tool is positioned outside of the predetermined accuracy range is indicated.

In response to a third user input received from the user interface, the first and the second linear output beams are simultaneously projected that together can be used to indicate level, plumb and square alignment. Any error in the accuracy of the first and second linear output beams as indicators of level and plumb when the tool is positioned outside of the predetermined accuracy range is indicated.

In response to a fourth user input received from the user interface, the first and the second linear output beams are projected that together can be used at least to indicate square, even when the tool is positioned outside of the predetermined accuracy range.

Implementations of the invention may include one or more of the following. The tool is positioned outside the predetermined accuracy range when the tool is inclined in any direction in the range of approximately plus or minus 4 to 9 degrees from horizontal. In another embodiment, the tool is positioned outside the predetermined accuracy range when the tool is inclined in any direction more than approximately 9 degrees from horizontal.

The invention can be implemented to realize one or more of the following advantages. The laser alignment tool includes an error indicator permitting a user to operate the tool to accurately indicate level, plumb and square alignment, knowing the tool will be disabled, or the user will be otherwise notified, if the tool is positioned such that indications of level and plumb alignments may be inaccurate. A user has the option of deactivating the error indicator, to permit use of the tool to indicate square alignment when the tool is in virtually any position, including positions that would not accurately indicate level and plumb. The means for mounting the optical elements to the projection unit are configured to allow necessary adjustments to precisely position the optical elements to produce straight alignment lines with relative ease, while requiring a relatively small footprint. The small size of the mounting apparatus provides a compact and lightweight implementation of the tool, which a user can operate with one hand, leaving a free hand to make alignment marks.

The details of one or more embodiments of the invention are set forth in the accompanying drawings and the description below. Other features and advantages of the invention will be apparent from the description, the drawings, and the claims.

DESCRIPTION OF DRAWINGS

FIG. 1 is a laser-based tool and a schematic representation of two output beams.

FIG. 2A is a front view of the laser-based tool of FIG. 1 tilted to one side.

FIG. 2B is a side view of the laser-based tool of FIG. 1 tilted to one end.

FIG. 3 is a schematic representation of a laser-based tool projecting alignment lines onto a floor surface.

FIG. 4 is a rear view of the laser-based tool of FIG. 1.

FIG. 5 shows an support frame of a laser-based tool.

FIG. 6 is an exploded view of the support frame of FIG. 5 and a view of a projection unit.

FIG. 7 is a front view of the support frame and projection unit of FIG. 6.

FIG. 8 is an exploded view of the projection unit of FIG. 6.

FIGS. 9A and 9B are schematic representations of the paths of laser beams emitted from laser diodes.

FIG. 10 is a partially exploded view of a mounting apparatus for a rod lens.

FIG. 11 is a view of the projection unit of FIG. 6.

FIG. 12A shows a front view of a plate included in the mounting apparatus of FIG. 10 and shown in FIGS. 12B and 12C.

FIG. 13 is a side view of the mounting apparatus of FIG. 10.

FIG. 14 is a view of the projection unit of FIG. 6 and a portion of the support frame of FIG. 5.

FIGS. 15A–C are top, front and side views respectively of a laser-based tool.

FIGS. 16A–C are top, front and side views respectively of a projection unit suspended from a portion of the support frame of the laser-based tool of FIGS. 15A–C.

Like reference symbols in the various drawings indicate like elements.

DETAILED DESCRIPTION

Referring to FIG. 1, a laser alignment tool 100 is shown capable of indicating level, plumb and square alignment. The tool 100 includes a housing 102 having a window 116, from which output beams 118, 120 are projected. The beams 118, 120 have a substantially perpendicular arrangement with each other and form vertical and horizontal alignment indicators. In one implementation, an alignment indicator can be the image of a substantially straight line on the surface against which an output beam is projected. For example, the vertical and horizontal alignment indicators 122 and 124 shown in FIG. 1, which are substantially perpendicular to one another. In another embodiment an alignment indicator can be a point of light on a surface against which the output beam is projected. Alternatively, two or more points of light can be projected, connected by an imaginary straight line, the straight line being an alignment line, and the points of light used as alignment indicators.

The vertical alignment indicator 122 can be used to indicate plumb, the horizontal alignment indicator 124 can be used to indicate level, and both alignment indicators 122, 124 together can be used to indicate square. In the embodiment shown, the housing includes an upper wall 104; a base 106; side walls 108, 110; a rear wall 112; and a front wall 114. The front wall 114 includes the window 116. However, other embodiments are possible, such as a housing including rounded walls or a cylindrically shaped housing.

The tool 100 includes a projection system or unit for projecting the output beams 118, 120, wherein a light source and all necessary optical components for projecting the output beams are mounted in a fixed relationship to each other, preferably in a single unit. A self-leveling feature includes pendulously suspending the projection unit from a support frame, for example, by a gimbal mount, or other methods of pendulous suspension, such as by a spring or wire flexures, as known in the art. The tool 100 is preferably operated by setting the base 106 on a substantially level surface, however the self-leveling feature can allow for accurate level and plumb alignment indicators when the tool 100 is inclined within a certain range from horizontal, referred to herein as the "accuracy range".

Referring to FIGS. 2A and 2B, the tool 100 is shown as tilted from side-to-side at an angle θ from a horizontal plane 126 (FIG. 2A), and tilted from front-to-back at an angle θ from the horizontal plane 126 (FIG. 2B). The accuracy range, meaning the range of angle θ within which the tool 100 can provide accurate level and plumb alignment indicators, depends in part on the geometry of the tool 100.

In the embodiment shown, where the tool 100 is sized to fit comfortably within the palm of a human hand, the accuracy range is between approximately 0° and plus or minus a maximum inclination in the range of approximately 4 to 7 degrees from horizontal. However, in another embodiment having a larger housing, for example, the accuracy range can be approximately plus or minus 0 to 9 degrees from horizontal.

The tool 100 can include an error indicator that operates to notify a user when the tool 100 is inclined from horizontal beyond the accuracy range, thereby compromising the integrity of the level and plumb alignment indicators 122, 124. The error indicator can include a cut-off mechanism that cuts off power to the laser diodes when the cut-off mechanism senses the housing is inclined beyond the accuracy range, ceasing projection of the output beams. An example of such a cut-off mechanism is described in U.S. Pat. No. 5,144,487, issued Sep. 1, 1992, for "Portable Laser Device for Alignment Tasks" to William Hersey, the entire contents of which are hereby incorporated by reference. In this manner, the user is notified that the tool 100 is inclined beyond the accuracy range, and the tool 100 is effectively disabled, thus not allowing the inadvertent use of inaccurate level and plumb alignment indicators. A further example of a cut-off mechanism is described below in reference to FIG. 14. In another embodiment, the error indicator can be a mechanism causing the output beams to blink.

Although the alignment indicators 122, 124 may not accurately indicate level and plumb when the tool 100 is inclined beyond the accuracy range, the indicators 122, 124 together can still accurately indicate a square alignment. That is, the alignment indicators 122, 124 maintain their perpendicular relationship to one another, and although not indicating true horizontal or true vertical, can still indicate a true 90° angle. A drawback of the error indicators described above is that the tool 100 is effectively disabled once inclined beyond the accuracy range, thus not permitting a user the option of using the tool 100 to indicate square alignment outside the accuracy range.

To allow a user the option of using the tool 100 to indicate square alignment when the tool 100 is inclined beyond the accuracy range, the tool 100 further includes an override mechanism, allowing a user to deactivate the error indicator. The tool 100 can therefore be used to indicate square alignment when in virtually any position, without regard to the accuracy range that is relevant only to the level and plumb alignment indicators. Referring to FIG. 3, a use for the tool 100 when inclined beyond the accuracy range is exemplified. In this example, a user requires square alignment indicators to be projected onto a floor 130, for the purpose of laying tiles square to one another on the floor surface. By deactivating the error indicator, the tool 100 can be inclined at 90° from horizontal, such that the window 116 is substantially parallel with the floor 130 and output beams 118, 120 are directed toward the floor 130, providing square alignment indicators 132, 134 on the floor surface. A variety of other uses in the construction and carpentry trades, for example, are also imaginable, such as projecting alignment indicators on a ceiling for mounting lighting fixtures.

In one embodiment, the tool 100 can include a user-friendly interface for interacting with a user. Referring to FIG. 4, the rear wall 112 of the tool 100 is shown. The rear wall has an inclined portion 138, which includes a button 140 and a light 142. In this embodiment, a user can operate the tool 100 as follows. Starting with the tool 100 powered down, the light 142 is not illuminated, indicating the tool 100 is in the OFF position. A first press of the button 140 powers up the tool 100 and projects a horizontal linear output beam, providing a horizontal alignment indicator, with the error indicator activated. The light 142 shines green, indicating that the power is ON, and that the error indicator is activated.

A second press of the button 140 turns off the horizontal output beam, and projects a vertical linear output beam, providing a vertical alignment indicator. The light 142 continues to shine green, indicating the power is ON and the error indicator is activated.

A third press of the button 140 turns on the horizontal linear output beam, projecting both output beams and providing both horizontal and vertical alignment indicators. The light 142 shines green, indicating the power is ON and the error indicator is activated.

A fourth press of the button 140 causes the override mechanism to deactivate the error indicator. The linear output beams continue to be projected, providing both horizontal and vertical alignment indicators. The light 142 now shines red, indicating that the power is ON, but that the error indicator has been deactivated. By changing the color emitted from the light 142, the user is notified that the error indicator is not activated, and that the tool 100 may provide inaccurate level and plumb alignment indicators, although the alignment indicators can still be used to provide square alignment.

A fifth press of the button 140 powers down the tool 100, and the light 142 does not shine, indicating the tool 100 is in the OFF position. The next press of the button 140 would start the above described cycle over again.

The user interface shown in FIG. 4 is one embodiment: however, any other convenient arrangement can be used to interact with a user, such as multiple buttons, an LCD or the like.

In one embodiment, the error indicator and override mechanism can be embodied in an implementation of the tool 100 as follows. Referring to FIGS. 5–8, the tool 100 can include a support frame 200, located within the tool housing 102, from which a projection unit 202 can be pendulously suspended by a gimbal mount 204.

Referring particularly to FIG. 5, the support frame 200 is shown without the projection unit 202, which would be suspended centrally within the support frame 200. The support frame 200 includes a generally U-shaped, rigid portion 206 forming two sidewalls 207 and a base 209. An upper portion 208 is attached within the U-shaped portion 206, for example, by using screws, and provides a receiving surface for a gimbal mount 204 used to suspend the projection unit 202. The U-shaped portion 206 and upper portion 208 are preferably made from a metal, such as aluminum, that is sufficiently rigid, yet lightweight. Other metals can be used, for example, stainless steel. Soft, padded members 210 are positioned on either side of the upper portion to absorb impact on the tool 100 typical to its use in the construction and carpentry trades. An energy absorbent stop 212 is also positioned within the U-shaped member to limit motion of the projection unit 202 when suspended within the support frame 200. The padded members 210 and stop 212 can be made of rubber, such as 40 durometer EPDM rubber. A magnet 214, used in a damping system described further below, is affixed to the interior of the base of the U-shaped portion 206.

Referring particularly to FIGS. 6 and 8, FIG. 6 shows an exploded view of the support frame 200 and a view of the projection unit 202 is shown, and FIG. 8 shows an exploded view of the projection unit 202. The projection unit 202 includes an central core portion 216 which houses first and second laser diodes 226, 228. The laser diodes can be selected to emit visible light having a wavelength between about 630 to 650 nanometers (nm), such as model DL-4038-31 available from Sanyo Semiconductor Corporation in San Diego, Calif., and model HL6332G available from Hitachi Semiconductor (America) Inc. of San Jose, Calif., which emit visible light at a wavelength of 635 nm at a power of 10 milliwatts.

First and second collimators 218, 220 are fixedly mounted to the central core 216 in alignment with the first and second laser diodes 226, 228 respectively. In one implementation, each collimator can be a focus lens, such as model A375 available from Eastman Kodak Company of Rochester, N.Y., or an aspheric lens, such as model AC-210-T635 available from Anteryon of Eindhoven, The Netherlands. The first and second collimators 218, 220 direct first and second collimated beams into first and second optical elements 222, 224.

Referring to FIGS. 9A and 9B, the first and second laser diodes 226, 228, collimators 218, 220 and optical elements 222, 224 are shown outside the context of the projection unit 202. A diverging beam 230, 232 is emitted from each laser diode 226, 228 and directed at each collimator 218, 220, which collimates each beam and from which the collimated beams are immediately incident on the optical elements 222, 224, producing linear output beams 234, 236. In one implementation, the optical elements 222, 224 can be rod lens, such as a micro rod lens available from Edmund Industrial Optics of Barrington, N.J., or a 5 mm rod lens available from SOTA Precision Optics, Inc. of Orange, Calif. In other implementations, other types of optical elements can be used, for example, a cylindrical lens or a Kodak™ Hybrid LG-P9 available from Eastman Kodak Company of Rochester, N.Y. As known to those skilled in the art, passing a collimated beam through a rod or cylindrical lens has the effect of fanning the beam into a linear output beam. The fanned vertical and horizontal linear output beams 234, 236 project vertical and horizontal alignment indicators respectively. The brightness of the projected alignment indicators can vary, depending in part on the strength of the laser beam emitted from the laser diode. An implementation using the laser diodes described above can produce highly visible, bright alignment indicators suitable for use both indoors and outdoors.

An important feature of a portable laser alignment device is to contain the device within a relatively small housing. The tool 100 is configured such that the tool 100 can fit comfortably within the palm of a human hand, and is sufficiently lightweight to allow a user to operate the tool while holding it in one hand, and conveniently carry it on a tool belt when not in use. The mounting devices used to mount the optical elements 222, 224 to the projection unit 202 play an important role in allowing the tool 100 to be configured into such a small footprint. The position of an optical element in relation to a collimated beam incident on the optical element, and in relation to the central core 216 of the projection unit 202 is critical, in order to produce the image of a straight line free from distortions, such as bowing slightly in one direction resulting in a curved (a frown or smile) rather than straight line. Precisely positioning the optical element to produce a straight line requires a number of adjustments.

FIG. 10 shows a partially exploded view of a configuration of a mounting device 240 that can have a relatively small size, and that permits the required adjustments to precisely position an optical element to produce a straight line with relative ease, is shown. Referring to FIGS. 10 and 11, there are at least three adjustments required to position the optical element. For the purposes of illustrating the required adjustments, the optical element shown in FIGS. 10 and 11 corresponds to the second optical element 224 shown in FIG. 6, which in the implementation shown is a rod lens.

Although the rod lens 224 may be centrally aligned with the collimator 220, an inherent error in the collimated beam, due to tolerances error of laser diode packaging, will almost always cause the beam to fall disproportionately on one side of an axis through the center of the rod lens 224. In this example, the rod lens 224 is oriented vertically and will produce a fanned linear horizontal output beam. If a vertical axis were drawn down the center of the rod lens 224, the collimated beam would be seen to fall disproportionately on one side or the other of the vertical axis. As a result, the projected linear output beam is unevenly distributed in relation to where a user is pointing the tool. That is, if a user points the tool at a particular point on a wall, for example, the projected linear output beam will be shorter to one side of the point than to the other side of the point.

The first adjustment to position the rod lens 224 requires laterally moving the rod lens 224 slightly to one side or the other to center the collimated beam, such that the beam is incident on the center of the rod lens 224. Referring to FIGS. 12A–C, the rod lens 224 is mounted on a plate 242 having a central opening 248 for the rod lens 224. The plate 242 includes a slotted first opening 244 on one side of the central opening 248, and a substantially round second opening 246 on the opposite side of the central opening 248. The rod lens 224 can be mounted to the plate using, for example, an adhesive. The first and second openings 244, 246 are configured to receive connectors 250, 251 (FIG. 12B) for connecting the plate 242 to a base 252. The connectors can be any convenient means, such as screws or pins. When the rod lens 224 is mounted within the plate 242 and the connectors 250, 251 are in place connecting the plate 242 to the base 252, the plate can be laterally displaced slightly from side to side (as represented by arrow "A") due to the slotted shape of the first opening 244, allowing some swivel movement of the plate relative to the connector 250. The slotted first opening 244 is configured to allow sufficient movement of the plate 242 to center the rod lens 224 in relation to the collimated beam incident on the rod lens 224.

The second required adjustment is necessary to ensure the collimated beam is perpendicular to the surface of the rod lens 224 upon which the beam is incident, so that the linear output beam emitted from the rod lens 224 will fall in one plane, to eliminate curvature of the linear output beam. A spring 254, shown in FIG. 10, is positioned between the plate 242 and the base 252, when the connectors 250, 251 are in place connecting the plate 242 and the base 252. FIG. 13 shows a side view of the mounting device 240 with the plate 242 secured to the base 252 and the spring 254 positioned about the connector 251 between the plate 242 and base 252. Because the spring 254 is between the plate 242 and base 252, the plate 242 can be moved in the direction of arrow B, for example, by tightening or loosening the connector 251 if the connector is a screw. The rod lens 224 can thereby be positioned by adjusting the connector 251 to move the plate 242 until the collimated beam is perpendicularly incident on the surface of the rod lens 224. In other embodiments the spring 254 can be other convenient means to allow for longitudinal displacement, such as a spring flexure or a threaded assembly.

The first and second adjustments described above are done once the mounting device 240 is itself mounted to the projection unit 202. As shown in FIG. 11, the mounting device 240 is positioned about a support 258 protruding from the central core 216 of the projection unit 202. In one implementation, as shown, the support 258 is a cylinder sized to fit within the rounded interior surface 260 of the base 252. The mounting device 240 can be held in place by a snug fit, and once properly positioned, can be held permanently in place by any convenient means, such as an adhesive or a solder. Before the mounting device 240 is positioned on the support 258, the collimator 220 is positioned protruding from the support 258, such that when the mounting device is in place, the collimator 220 is positioned between the laser 228 (and the support 258) and the rod lens 224.

The third adjustment requires moving the mounting device 240 relative to the projection unit 206 on which it is mounted, to achieve true vertical of the mounting device relative to the projection unit 206. In the case of the upper mounting device 262 housing the horizontally aligned rod lens 222, the mounting device 262 is adjusted to achieve true horizontal of the mounting device 262 relative to the projection unit 202. The adjustment to achieve true vertical is achieved by simply rotating the mounting device 240 about the support 258 until the mounting device 240 is vertically aligned with the projection unit 202. The mounting device 240 is then permanently affixed to the support 258 using, for example, an adhesive. The upper mounting device 262 is similarly adjusted to achieve true horizontal and then affixed in place.

The mounting device 240 is made of a rigid material, preferably a lightweight metal such as aluminum, although a second material, such as brass, can be used for the plate 242. Other suitable materials can also be used, such as stainless steel.

The projection unit 202 is designed such that when suspended from the gimbal mount 204 the projection unit 202 will balance so the linear output beams 234, 236 are truly vertical and horizontal. In practice, manufacturing tolerances may be such that the projection unit 202 may not balance precisely as fabricated. Thus, it may be necessary to adjust the balance of the projection unit 202 after it has been assembled. Referring to FIG. 8, showing an exploded view of the projection unit 202, in one implementation the projection unit 202 can be balanced by inserting and adjusting one or more screws, such as two brass set screws 217, 219 shown, in the lower portion of the projection unit 202. Weight may thus be added to or removed from the projection unit 202 by adding or removing the screws 217, 219 and thereby adjusting the balance of the projection unit 202.

The projection unit 202 can include a damping system to limit pendular motion when the tool is set down on a surface, such as the damping system described in U.S. Pat. No. 5,144,487, previously incorporated herein by reference. Referring to FIGS. 6 and 7, such a damping system can include the magnet 214 secured to the inside of the base 206 of the support frame 200, and a copper damping plate 264 attached to a shaft 266 protruding downwardly from the projection unit 202. The damping plate 264 is formed and positioned such that a precise gap 270 is maintained at a predetermined width when the damping plate 264 is in motion over the magnet 214. The gap 270 is sufficiently small such that motion of the damping plate 264 causes eddy currents to be generated in the plate 264. Interaction of the eddy currents in the damping plate 264 with the magnetic field of the magnet 214 causes damping of pendular motion of the projection unit 202. The damping force may depend on the mass and thickness of the magnet 214, the dimension of the gap 270 and the thickness of the copper plate 264. Preferably the magnet 214 is a neodymium magnet approximately three-quarters of an inch in diameter and a quarter of an inch thick. The damping plate 264 is preferably three-quarters of an inch thick and has a maximum diameter of 0.625 inches at its widest point and a minimum diameter of 0.500 at its narrowest point. Other types of magnets may be used and other arrangements of one or more magnets may be used to accomplish the damping function, as is known in the art. In addition, other shapes and/or materials can be used for the damping plate, as is also known in the art. Alternatively, the "plate" can be an integral portion of the projection unit.

The laser diodes 226, 228 can be powered by a rechargeable battery located in a battery compartment within the housing 102. The battery is connected to the diodes 226, 228 by a connector extending from the battery terminal. The connector can be an ultraflexible micro-miniature conductor obtainable from New England Electric Wire Company of Lisbon, N.H. The connector is lead to an on-off switch attached to the housing 102. The connector is then lead through the center of the gimbal mount 204 and connected to the laser diodes 226, 228. Leading the connector through the gimbal mount 204 is one technique to ensure the connector has a negligible effect on the balance of the projection unit 202.

Provision is made to prevent excessive motion of the projection unit 202 when the tool 100 is set down on a surface which is far from level. Referring to FIGS. 5 and 6, the energy absorbent stop 212 is positioned such that when the tool 100 is inclined at approximately plus or minus seven degrees (7°) or greater from the horizontal, the damping plate 264 contacts the stop 212, thus limiting further relative movement between the projection unit 202 and the support frame 200.

As discussed above, the tool 100 can include a cut-off switch that will cut off power to the laser diodes 226, 228 when the housing 102 is inclined in any direction plus or minus a predetermined angle from horizontal. In the embodiment shown, the predetermined angle can be approximately plus or minus 6°, however, the angle can vary depending on the geometry of the tool 100, and, as already discussed above, can be in a range of approximately plus or minus 4 to 9 degrees.

Referring to FIG. 14, a partially exploded view of a portion of the support frame 200 and the projection unit 202 and is shown. The cut-off mechanism can include a wire flexure 272 attached to and protruding above the upper portion of the projection unit 202. The cut-off mechanism further includes a small metal plate 274 attached to the top of the support frame 200, the plate 274 including an aperture 276. The aperture 276 is sized and positioned such that the wire flexure 272 projects through the center of the aperture 276 when the projection unit 202 is suspended from the support frame 200. The wire flexure 272 carries a charge from the projection unit 202, which is charged due to the rechargeable battery used to power the laser diodes 226, 228. When the housing 102 is inclined beyond the accuracy range, for example 7° from horizontal, the wire flexure 272 contacts the metal interior of the aperture 276, which in essence behaves as a contact switch, indicating to the laser power drive that power to the laser diodes 226, 228 should be cut-off, which can be accomplished, in one example, by conventional digital logic. Other embodiments are possible using different cut-off switches, for example, an omnidirectional mercury switch.

As discussed above, the tool 100 includes an override mechanism to allow a user to deactivate the cut-off switch described above. As already described with reference to FIG. 4, in one implementation, the user can deactivate the cut-off switch by pressing a button 140. Referring to FIG. 14, the button 140 is electrically connected to a circuit board 278 mounted to the central core 216 of the projection unit 202. Digital circuitry within the circuit board 278 can be used to deactivate or reactivate the cut-off switch in response to an electrical input received from the button 140. Other means for deactivating the cut-off switch can also be used, for example, firmware. The circuit board 278 can also control power to the laser diodes 226, 228.

As discussed above, using the mounting device used to mount the optical elements to the projection unit, combined with the damping system, advantageously allows the tool 100 to be embodied within a relatively compact housing with a relatively low overall weight. Referring to FIGS. 15A–C, in one embodiment, the tool 100 can be dimensioned to have a height X of approximately 3.3 inches, a width Y of approximately 2 inches and a length Z of approximately 2.8 inches. Referring to FIGS. 16A–C, the upper portion of the support frame 202 can have a width R of approximately 1.1 inches and a length S of approximately 1.3 inches. The distance T between the top of the upper portion of the support frame 202 and the bottom of the damping plate 264 is approximately 2.4 inches, and the distance U from the midpoint of the gimbal mount 204 to the bottom of the damping plate 264 is approximately 2.1 inches. In this configuration, the tool 100 can have a tool weight of approximately 10 ounces.

A number of embodiments of the invention have been described. Nevertheless, it will be understood that various modifications may be made without departing from the spirit and scope of the invention. Accordingly, other embodiments are within the scope of the following claims.

What is claimed is:

1. An apparatus for projecting an indication of alignment, comprising:

a housing;

a projection unit pendulously suspended in the housing to project output beams to indicate level, plumb and square, a damper to dampen pendular motion of the projection unit;

an error indicator to indicate to a user of the apparatus when the housing is inclined such that the accuracy of the level and plumb directions are compromised; and an override operable by the user to deactivate the error indicator, whereby said output beams can be used at least to indicate square alignment.

2. The apparatus of claim 1, wherein:

the projection unit includes:

at least one laser diode to emit a laser beam, a first and a second collimator to form a first and a second collimated beam, and a first and a second optical element to convert the first and second collimated beam into a first and a second linear output beam, the first and second linear output beams being projected from the housing in different but generally perpendicularly related directions, whereby the linear output beams can be used to indicate level, plumb and square alignment.

3. The apparatus of claim 2, wherein:

each collimator includes a focus lens.

4. The apparatus of claim 3, wherein:

each focus lens is an aspheric lens.

5. The apparatus of claim 2, wherein:
each optical element includes a rod lens.
6. The apparatus of claim 2, wherein:
each optical element includes a cylinder lens.
7. The apparatus of claim 2, further comprising:
at least one battery to provide power to at least one laser diode of the projection unit.
8. The apparatus of claim 1, wherein:
the error indicator suspends projection of the output beams.
9. The apparatus of claim 1, wherein:
the error indicator indicates the housing is inclined such that the accuracy of the level and plumb directions is compromised, when the housing is inclined in any direction in the range of approximately plus or minus 4 to 9 degrees from horizontal.
10. The apparatus of claim 1, wherein:
the error indicator indicates the housing is inclined such that the accuracy of the level and plumb directions is compromised, when the housing is inclined in any direction more than approximately 9 degrees from horizontal.
11. The apparatus of claim 1, wherein:
the override includes digital circuitry to deactivate the error indicator in response to a user input.
12. The apparatus of claim 1, wherein the damper includes:
a magnet mounted in the housing below the projection unit and a damping plate rigidly suspended from the projection unit, such that the damping plate is positioned above the magnet with a gap maintained therebetween sufficiently small that eddy currents are generated in the damping plate by motion thereof above the magnet.
13. The apparatus of claim 1, further comprising:
a user interface configured to receive a user input, wherein:
in response to a first user input, the projection unit projects a first output beam that can be used to indicate level;
in response to a second user input, the projection unit projects a second output beam having a generally perpendicular relationship to the first output beam, whereby the second output beam can be used indicate plumb;
in response to a third user input, the projection unit projects simultaneously the first and second output beams, whereby the output beams can be used to indicate simultaneously level, plumb and square; and
in response to a fourth user input, the override is employed to deactivate the error indicator, and the projection unit simultaneously projects the first and second output beams, whereby the output beams can be used to at least indicate square.
14. An apparatus for projecting an indication of alignment, comprising:
a housing;
a projection unit pendulously suspended in the housing to project linear output beams, the projection unit including:
two laser diodes configured and arranged to emit two laser beams,
two collimators configured and arranged to form the two laser beams into a first and a second collimated beam,
an optical element configured and arranged to convert the first and second collimated beams into a first and a second linear output beam, the first and second linear output beams being projected from the housing in different but generally perpendicularly related directions, whereby said linear output beams can be used to simultaneously indicate level, plumb and square, the optical element including:
a first and second lens to convert the first and second collimated beams into the first and second linear output beams,
a mount to mount the first and second lens to the projection unit, the mount including for each lens:
a member in which a lens can be mounted having openings through which connectors can be positioned, the openings allowing the member to be laterally displaced once the connectors are in position to align the lens such that the output beam is symmetrically projected from the housing,
a base configured to attach to the member by the connectors, where at least one connector includes a longitudinal adjustment mechanism to adjust the position of the lens such that the output beam is substantially straight, the base being mounted onto a support protruding from the projection unit and rotatable about the support to achieve true vertical in relation to the projection unit for the first lens and true horizontal in relation to the projection unit for the second lens; and
a damper configured and arranged to dampen pendular motion of the projection unit.
15. The apparatus of claim 14, further comprising:
an error indicator configured and arranged to indicate when the housing is inclined such that the accuracy of the level and plumb directions are compromised; and
an override device configured and arranged to deactivate the error indicator, whereby the output beams can be used to at least indicate square alignment.
16. The apparatus of claim 15, wherein:
the error indicator suspends projection of the output beams from the projection unit.
17. The apparatus of claim 15, wherein:
the error indicator indicates the housing is inclined such that the accuracy of the level and plumb directions are compromised, when the housing is inclined in any direction in the range of approximately plus or minus 4 to 9 degrees from horizontal.
18. The apparatus of claim 15, wherein:
the error indicator indicates the housing is inclined such that the accuracy of the level and plumb directions are compromised, when the housing is inclined in any direction more than approximately plus or minus 9 degrees from horizontal.
19. The apparatus of claim 14, wherein the longitudinal adjustment mechanism of the mount is a spring.
20. The apparatus of claim 14, wherein:
each collimator includes a focus lens.
21. The apparatus of claim 20, wherein:
each focus lens is an aspheric lens.
22. The apparatus of claim 14, wherein:
the first and second lens are each a rod lens.
23. The apparatus of claim 14, wherein:
the first and second lens are each a cylinder lens.

24. An apparatus for projecting an indication of alignment, comprising:
a housing;
a projection unit pendulously suspended in the housing to project linear output beams, the projection unit including:
two laser diodes configured and arranged to emit two laser beams,
two collimators configured and arranged to form the two laser beams into a first and second collimated beam,
an optical element configured and arranged to convert the first and second collimated beams into a first and a second linear output beam, the first and second linear output beams being projected from the housing in different but generally perpendicularly related directions, whereby said linear output beams can be used to simultaneously indicate level, plumb and square, the optical element including:
a first and second lens to convert the first and second collimated beams into the first and second linear output beams,
a mount to mount the first and second lens to the projection unit, the mount including for each lens:
a member in which a lens can be mounted having openings through which connectors can be positioned, the openings allowing the plate to be laterally displaced once the connectors are in position to align the lens such that the collimated beam is incident on the center of the lens,
a base configured to attach to the member by the connectors, where at least one connector includes a longitudinal adjustment mechanism to adjust the position of the lens so that the lens' longitudinal axis is substantially perpendicular to the collimated beam, the base being mounted onto a support protruding from the projection unit and rotatable about the support to achieve true vertical in relation to the projection unit for the first lens and true horizontal in relation to the projection unit for the second lens; and
a damper configured and arranged to dampen pendular motion of the projection unit.

25. The apparatus of claim 24, further comprising:
an error indicator configured and arranged to indicate when the housing is inclined such that the accuracy of the level and plumb directions are compromised; and
an override device configured and arranged to deactivate the error indicator, whereby the linear output beams can be used to at least indicate square directions.

26. The apparatus of claim 25, wherein:
the error indicator suspends projection of the linear output beams from the projection unit.

27. The apparatus of claim 25, wherein:
the error indicator indicates the housing is inclined such that the accuracy of the level and plumb directions are compromised, when the housing is inclined in any direction in the range of approximately plus or minus 4 to 9 degrees from horizontal.

28. The apparatus of claim 25, wherein:
the error indicator indicates the housing is inclined such that the accuracy of the level and plumb directions are compromised, when the housing is inclined in any direction more than approximately plus or minus 9 degrees from horizontal.

29. The apparatus of claim 24, wherein the longitudinal adjustment mechanism of the mount is a spring.

30. The apparatus of claim 24, wherein:
each collimator includes a focus lens.

31. The apparatus of claim 30, wherein:
each focus lens is an aspheric lens.

32. The apparatus of claim 24, wherein:
the first and second lens are each a rod lens.

33. The apparatus of claim 24, wherein:
the first and second lens are each a cylinder lens.

34. An apparatus for projecting an indication of alignment, comprising:
a housing;
a projection unit pendulously suspended in the housing to project output beams to indicate level, plumb and square directions;
means for damping pendular motion of the projection unit;
error indicator means for indicating to a user of the apparatus when the housing is inclined such that the accuracy of the level and plumb directions are compromised; and
override means operable by the user for deactivating the error indicator means, whereby said output beams can be used at least to indicate square.

35. The apparatus of claim 34, wherein:
the projection unit includes:
laser means for emitting two laser beams,
collimator means for forming the two laser beams into a first and second collimated beam, and
optical means for forming the first and second collimated beams into a first and a second linear output beam, the first and second linear output beams being projected from the housing in different but generally perpendicularly related directions, whereby the linear output beams can be used to indicate level, plumb and square alignment.

36. The apparatus of claim 35, further comprising:
battery means for providing power to the laser means.

37. The apparatus of claim 34, wherein:
the error indicator means suspends projection of the output beams from the projection unit.

38. The apparatus of claim 34, wherein:
the error indicator means indicates the housing is inclined such that the accuracy of the level and plumb directions are compromised, when the housing is inclined in any direction in the range of approximately plus or minus 4 to 9 degrees from horizontal.

39. The apparatus of claim 34, wherein:
the error indicator means indicates the housing is inclined such that the accuracy of the level and plumb directions are compromised, when the housing is inclined in any direction more than approximately plus or minus 9 degrees from horizontal.

40. The apparatus of claim 34, wherein:
the override means includes digital circuitry to deactivate the error indicator means in response to a user input.

41. A method for projecting an indication of alignment, the method comprising:
forming a first alignment beam and a second alignment beam that is substantially perpendicular to the first alignment beam, whereby the first alignment beam indicates level, the second alignment beam indicates plumb, and the first and second alignment beams together indicate square;

providing an error indicator to indicate to a user of the first and second alignment beams an error in the accuracy of the first and second alignment beams as indicators of level and plumb respectively; and deactivating the error indicator to override error indication, such that the first and second alignment beams can be used at least to indicate square alignment.

42. The method of claim 41, further comprising:

projecting a first and second laser beam; and collimating the first and second laser beam into a first and a second collimated beam incident on a first and a second optical element to convert the first and second collimated beams into the first and second alignment beams.

43. The method of claim 41, wherein the alignment beams are projected in the image of substantially straight lines.

44. A method of projecting an indication of alignment from a laser-based tool, the method comprising:

in response to a first user input received from a user interface that interacts with a user of the laser-based tool:
projecting a first linear output beam that can be used to indicate level, and
indicating to the user any error in the accuracy of the first linear output beam as an indicator of level when the tool is positioned outside of a predetermined accuracy range;

in response to a second user input received from the user interface:
projecting a second linear output beam being substantially perpendicular to the first linear output beam, whereby the second linear output beam can be used to indicate plumb, and
indicating to the user any error in the accuracy of the second linear output beam as an indicator of plumb when the tool is positioned outside of the predetermined accuracy range;

in response to a third user input received from the user interface:
simultaneously projecting the first and the second linear output beams that can be used together to indicate level, plumb and square alignment, and
indicating to the user any error in the accuracy of the first and second linear output beams as indicators of level and plumb when the tool is positioned outside of the predetermined accuracy range; and in response to a fourth user input received from the user interface:
simultaneously projecting the first and the second linear output beams that together can be used at least to indicate square alignment even when the tool is positioned outside of the predetermined accuracy range and overriding an indication to a user of an error in the accuracy of the first and second linear output beams as indicators of level or plumb when the tool is positioned outside of the predetermined accuracy range.

45. The method of claim 44, wherein the tool is positioned outside the predetermined accuracy range when the tool is inclined in any direction in the range of approximately plus or minus 4 to 9 degrees from horizontal.

46. The method of claim 44, wherein the tool is positioned outside the predetermined accuracy range when the tool is inclined in any direction more than approximately plus or minus 9 degrees from horizontal.

* * * * *